United States Patent [19]

Stuhler

[11] Patent Number: 4,955,522
[45] Date of Patent: Sep. 11, 1990

[54] PROCESS FOR THE LEAKPROOF JOINING OF CERAMIC SEALING DISKS TO METALLIC ATTACHMENTS

[75] Inventor: Helmut Stuhler, Röthenbach, Fed. Rep. of Germany

[73] Assignee: Hoechst CeramTec Aktiengesellschaft, Selb, Fed. Rep. of Germany

[21] Appl. No.: 327,707

[22] Filed: Mar. 23, 1989

[30] Foreign Application Priority Data

Mar. 25, 1988 [DE] Fed. Rep. of Germany ....... 3810190

[51] Int. Cl.$^5$ ............................................. B23K 103/16
[52] U.S. Cl. ...................... 228/122; 228/124; 228/239; 39/890.054; 39/890.129; 251/368
[58] Field of Search ............... 228/122, 124, 160, 170, 228/172, 239, 263.12; 29/157.1 R; 222/544; 251/368; 137/625.4

[56] References Cited

U.S. PATENT DOCUMENTS

| | | | |
|---|---|---|---|
| 3,874,635 | 4/1975 | Fletcher et al. | 228/1.1 |
| 3,901,772 | 8/1975 | Guillotin et al. | 228/122 |
| 4,111,178 | 9/1978 | Casey | 137/554 |
| 4,420,142 | 12/1983 | Dworak et al. | 251/368 |
| 4,575,047 | 3/1986 | Boos et al. | 251/356 |
| 4,736,772 | 4/1988 | Ostertag et al. | 137/625.4 |

FOREIGN PATENT DOCUMENTS

| | | |
|---|---|---|
| 0110336 | 1/1987 | European Pat. Off. . |
| 131145 | 6/1978 | Fed. Rep. of Germany ...... 228/124 |
| 3509520 | 9/1986 | Fed. Rep. of Germany . |
| 121171 | 7/1984 | Japan ................................... 228/239 |

OTHER PUBLICATIONS

Berichte der deutschem keramischen Gesellschaft, 42 (1965, pp. 452–454).
Werkstoffe & Konstruktion, vol. 1, No. 1, 1987, pp. 16–21.

Primary Examiner—Richard K. Seidel
Assistant Examiner—Samuel M. Heinrich
Attorney, Agent, or Firm—Foley & Lardner, Schwartz, Jeffery, Schwaab, Mack, Blumenthal & Evans

[57] ABSTRACT

A process for the leakproof joining of a ceramic sealing disk, which regulates the passage of a fluid, and metallic attachments which are presented to the disk, wherein a roughly finished ceramic disk is metallized at the points that are to be joined to the metallic attachment (for example, a copper pipe with flanged-on collar) and soldered at the metallized points to the metallic attachment. The metallic attachment may also be joined to the ceramic sealing disk without prior metallization if an active solder is used. In one embodiment, the sliding and sealing face is produced on the side of the disk facing away from the metallic attachment by grinding and/or lapping and/or polishing. Alternatively, the sliding and sealing face can also be first produced on the roughly finished sealing disk by grinding and/or lapping and/or polishing and joined to the metallic attachment by applying the metallization and soldering, or by active soldering, and then cooling at a rate of more than 30 K/min.

17 Claims, 1 Drawing Sheet

PROCESS FOR THE LEAKPROOF JOINING OF CERAMIC SEALING DISKS TO METALLIC ATTACHMENTS

DESCRIPTION

Ceramic sealing disks, for example those containing a high percentage of aluminum oxide (>90%), have a wide spectrum of applications. Thus, sanitary mixers for single-handed operation have such sealing disks which regulate both the flow rate and the temperature. Further fields of application are: heating systems of motor vehicles, gas mixers or oil shut-off valves. In all cases, the parts of the housing and the sealing parts have to be worked so precisely that the sealing effect is ensured after the fitting has been assembled. In particular, the sealing between the ceramic sealing disks and the metallic pipes presented to them or the metallic housings surrounding the sealing disks still presents difficulties today.

In DE-A No. 3 509 520, to seal the pipe of a sanitary fitting, a plastic insert is attached to the operating cartridge, the plastic insert at the same time carrying a supporting plate which contributes substantially to the sealing.

In EP-A No. 0 110 336, rubber seals with a lip-like shape are used to seal a pipe, which are intended to guarantee the sealing effect as a result of the assembly forces. The supply pipes have to be pressed tightly against the ceramic disks over the rubber seals. For this purpose, during the mounting or sealing of the cartridge, the pipes have to undergo in some way a force in the axial direction which produces the contact pressure. This may be done by screwing or clamping to the housing. The rubber seals in this version are generally O-shaped.

Frequently, the sealing disks of sanitary mixers for single-handed operation have, in addition to the two openings for the hot and cold water supply pipes, yet a further opening for transmitting the mixed water, it being necessary to fit a rubber seal of complicated shape precisely at the bottom of the sealing disk in order to prevent an uncontrolled discharge of the mixed water. A considerable problem is the precise positioning of the rubber parts when assembling the fitting. If a rubber seal slips slightly, the sealing effect of the entire equipment is jeopardized because the contact pressure is not uniformly distributed or the rubber part is squeezed out. A further disadvantage when using rubber seals is that they age and therefore have to be replaced from time to time if the fact that the fitting becomes leaky is unacceptable. In this way, one advantage of ceramic sealing disks is lost again, namely that of being maintenance-free. The state of the art fails to disclose any leakproof, mechanically strong, materially continuous and permanent joint between ceramic sealing disks and the supply pipes and/or the metallic housing wall.

The object of the invention is to join ceramic sealing disks mechanically strongly, materially continuously, permanently and in a leakproof manner to the metallic supply pipes and, if necessary, to the metallic housing wall while avoiding difficult and unreliable sealing with shaped rubber parts.

This is achieved by a process for the leakproof joining of ceramic sealing disks to metallic attachments, in which the sealing disk is metallized at the points that are to be joined to the metal and then the metallic attachment is soldered to the metallized ceramic, or in which the metallic attachment is soldered to the ceramic sealing disk directly by means of an active solder, which process comprises (a) metallizing the roughly finished sealing disk and then soldering it to the metallic attachment or soldering it directly to the metallic attachment by means of an active solder and subsequently producing the sliding and sealing face of the ceramic sealing disk by grinding and/or lapping and/or polishing, or (b) first producing the sliding and sealing face on the roughly finished sealing disk by grinding and/or lapping and/or polishing and, after applying the metallization and after soldering to the metallic attachment or after active soldering, cooling in each case at not more than 30 K/min.

Figure 1:
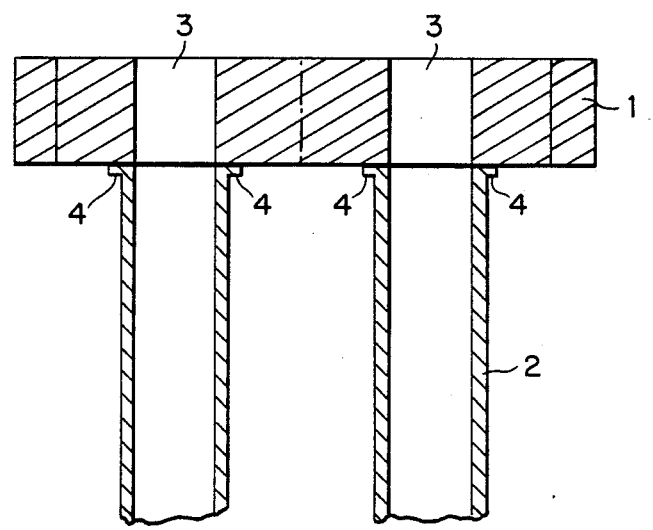
FIG. 1 shows a sealing disk 1 with two openings 3 and two metallic pipes 2 having flanges 4 fixed to the sealing disk.

The metallization of ceramic and a subsequent firm joining of this metallized ceramic to a metal is known and can be carried out, for example, by first depositing a molybdenum/manganese metallization paste on the ceramic and baking it in. The metallization pastes are composed usually of $MnO_2$, $MgO$, $Al_2O_3$ and $SiO_2$ in varying compositions and a metal such as molybdenum or tungsten. Such metallization pastes are described, for example, in Berichte der deutschem keramischen Gesellschaft 42 (1965, pages 452–54). A copper or nickel layer is then deposited chemically or by electroplating on the thus baked-in metallization. This copper or nickel layer can now be readily soldered in turn to a metal. In this way, an unbroken, materially continuous transition from ceramic to metal can be produced which is mechanically strong, leak-proof (usually also gastight) and permanent. Another possibility for joining ceramic to metal is to place an active solder between metal and ceramic and to solder the metal to the ceramic in a single step by means of the active solder. Such active solders are composed, for example, of elements which have an affinity for oxygen, such as titanium, copper or zirconium, and which, on melting, form on the one hand oxides which enter into a materially continuous joint with the oxidic constituents of the ceramic and on the other hand enter, as a metal in the liquid phase, into an alloy with the metal to be soldered on. Consequently here again, a more or less unbroken transition from metal to ceramic is provided. Known active solders are furthermore glass solders for fixing metal lead-throughs in ceramic. The glass solder is placed as a powder or preformed body on the point to be joined and melted. Such active solder processes are described in Werkstoffe & Konstruktion, Vol. 1, No. 1, 1987, pages 16–21.

It was, however, absolutely surprising that the metallization techniques described above can also be applied in the case of ceramic sealing disks since the person skilled in the art had to assume that the relatively high temperatures required for soldering would result in deformations of the ceramic which make the latter valueless for use as a sealing disk. Even the slightest deviations from planarity in the sealing plane of the sealing disk result in leak formation. This circumstance is undoubtedly the reason why metallization of ceramic sealing disks has hitherto not been employed. The process according to the invention offers an escape from this cul-de-sac, with the result that all the advantages which the metallized ceramic provides can now also be extended to ceramic sealing disks.

For example, sanitary mixing taps for single-handed operation are now substantially simpler to design since it is possible to dispense with the complicated and sensitive rubber or plastic seals and their holding devices. Obviously, uses with media such as oils, weak acids or the like are now possible provided the chemical properties of the media are taken into account in the rest of the design of the sealing of the fitting. In addition, the ceramic sealing disk/metal joint is gas tight, with the result that gaseous media can also be transmitted. In particular, use of this seal offers an appreciable advantage over the prior art using rubber seals for the transmission of flammable gases since the metal/ceramic joint remains leakproof even in the case of fire.

In the process according to the invention the best procedure is to coat the rough sealing disk, i.e. the sealing disk in the condition in which it emerges from the firing oven or one that has only been closely ground flat on one side after firing, with a standard metallization paste—such as are described, for example, in loc. cit. Ber. d. dtsch. Ker. Ges.—at those points at which it is to be firmly joined to the metal attachments and bakes it in. This baked-in metallization paste is then copper-plated or nickel-plated chemically or by electroplating. To solder the metallic attachment to the sealing disk after the conventional metallization described, the following two soldering processes can, for example, be employed. Soft soldering with lead-tin-base solders at soldering temperatures of up to 450° C. which results in leakproof, ductile joints. For the purpose of soldering, matching metallic attachments are precisely positioned along with a soldering preform, which is matched to the shape of the metallic attachment, on the sealing disk in a soldering template. When the melting point of the solder is reached, it spreads out and wets not only the layers adhering to the ceramic sealing disk but also the metal. After being cooled to room temperature, the sealing disk and the soldered-on metallic attachment can be removed from the soldering template and are joined permanently and materially continuously. Hard soldering is to be recommended, in particular, if fairly high strengths are required. In that case, silver-copper solders are generally used which require soldering temperatures of over 450° C.

The sealing disk may, however, also be joined directly to the metallic attachment by means of active solders for metal/ceramic joints (see loc. cit. Werkstoffe & Konstruktion).

Metallic attachments are primarily understood to mean the supply pipes which conduct the hot and cold water to the mixing tap in sanitary mixers for single-handed operation, for example, using ceramic sealing disks. These pipes are preferably of copper. In order to increase the strength of bonding of pipes to the ceramic sealing disk still further, the pipe/sealing disk contact surface can be further increased by a collar-shaped flange on the pipe. Furthermore, metallic attachments are also understood to mean those parts which are given complicated shapes (for example, parts produced in deep-drawing molds) and which enclose the entire sealing disk. These parts then seal, for example, the disk in the downward direction like a base so that a mixed medium flowing through is able to reach a discharge. The metal parts may be manufactured, for example, from copper, iron-nickel or iron-nickel-cobalt.

According to the invention it is only now that the rough sealing disk which is joined materially continuously on one side to one or more metallic attachments is ground and/or lapped and/or polished on the side situated opposite the metallic attachments, with the result that the actual sealing face is produced. It has been found that polished sealing disks can also be metallized and soldered or soldered directly by means of active solders, without suffering the damage described above, provided care is taken to ensure that the sealing disk which has been joined to the metal is only cooled slowly to room temperature after firing the metallization and/or after soldering to the metal, with the result that the entire cooling curve (T=f(t)) is markedly flattened. The cooling rate chosen for this purpose is such that the thermal stresses produced do not lead to destruction of the metal/ceramic joint and such that the outstanding planarity of the finished sealing disks is maintained. Cooling times of not more than 30 K/min, preferably 10-20 K/min have proved to be beneficial. These prolonged cooling times after metallizing or soldering are achieved, for example, by matching the speed of the conveyor belt which conveys the product through the furnace to the known temperature profile of the furnace so that the cooling times specified above are maintained. The desired result—a cooling curve which is flatter overall—can, of course, only be achieved if the cooling takes place as constantly as possible over the entire period. This process is particularly advantageous if it is intended to join the ceramic sealing disk to a metallic attachment, for example to the housing of a sanitary fixing, at the circumference side as well since, once fitted, the sealing disk can no longer be polished or can only be polished very laboriously.

The invention is explained in more detail in the examples below.

EXAMPLE 1

Soldering of two copper pipes to a ready polished sealing disk (frit-free)

A two-hole $Al_2O_3$ sealing disk composed of 96% $Al_2O_3$ ceramic with the following dimensions was used:

| | |
|---|---|
| Diameter: | 40 mm |
| Thickness: | 8 mm |
| Position of the holes on the disk: | Center point of the holes at an angular distance of 45° |
| Distance of the center point of the holes from the center point of the disk: | 10 mm |
| Two elongated holes, curved: | 3 mm × 10 mm |

Dimensions of the copper pipes to be fitted:

| | |
|---|---|
| Ovally curved: | 5.5 mm × 12 mm |
| Length: | 11.5 mm |
| Wall thickness: | 1 mm |
| Flanged-on collar: | 2.5 mm |

A frit-free, commercially available molybdenum/manganese preparation (metallization preparation without glass phase) was applied to the edges of the two elongated holes on the side of the sealing disk which had not been ground flat and the preparation was baked in at 1280° C. The cooling was carried out at 14 K/min. The Mo/Mn metallization was then reinforced by electroplating with a 3 μm thick nickel layer. An Ag/Cu soldering disk was now positioned precisely on this metallization reinforced with nickel and the sealing disk and soldering ring were inserted in a soldering template. The fixing of the two Cu pipes, whose projecting collars were mounted precisely on the soldering ring, was carried out at the same time. The soldering-on of the Cu pipes was carried out in a reducing atmosphere at 830° C. The cooling rate was again 14 K/min.

EXAMPLE 2

Soldering of two copper pipes to a ready-polished sealing disk (frit-containing)

A frit-containing commercial metallization preparation (metallization preparation containing glass phase) was applied to the edges of the two elongated holes (sealing disk according to Example 1) on the side of the sealing disk which had not been ground flat and the preparation was baked in at 1100° C. (cooling rate as in Example 1). The reinforcement of the metallization with a 3 μm thick nickel layer and the soldering of the Cu pipes (according to Example 1) by means of an Ag/Cu soldering disk were carried out as specified in Example 1 (with the same cooling rate as well).

EXAMPLE 3

Soldering of two copper pipes to a sealing disk which has only been roughly ground (frit-free)

With the sealing disk (dimensions as in Example 1) which had only been roughly ground, the procedure was exactly the same as described in Example 1, with the distinction that the cooling rate after firing the metallization and after soldering on the Cu pipes (dimensions as in Example 1) was 30 K/min. The cooled sealing disk with the Cu pipes soldered on was only then ground, polished and lapped, the sliding plate being produced on the side opposite the Cu pipes.

EXAMPLE 4

Soldering of two copper pipes to a sealing disk which has only been roughly ground (frit-containing)

With the sealing disk (dimension as in Example 1) which had only been roughly ground, the procedure was exactly the same as described in Example 2, with the distinction that the cooling rate after firing the metallization and after soldering on the Cu pipes (dimensions as in Example 1) was 30 K/min. As described in Example 3, the sliding plane was then produced.

The breaking strength of the metal/ceramic joints (Cu pipe/sealing disk) was in all cases (Examples 1-4) over 130 N/mm$^2$. The sliding planes of all the sealing disks with Cu pipes soldered on produced in Examples 1-4 were flat. The sealing disks were incorporated in fittings and were all (Examples 1-4) water-tight up to a pressure of 7 bar. The gas-tightness of the metal/ceramic joints (Cu pipe/sealing disk) was checked down to a low pressure of $10^{-8}$ mbar·1/sec. No leaks occurred.

COMPARISON EXAMPLE

Example 1 was repeated, with the distinction that the cooling rate after firing the metallization and after soldering on the Cu pipe was increased to 40 K/min. The sliding plane was no longer flat in this case, with the result that the fitting in which this sealing disk was incorporated was no longer water-tight.

I claim:

1. A process for the leakproof joining of a ceramic sealing disk having at least one opening with at least one metallic pipe having an opening, comprising the steps of:
   (A) contacting together with solder the metallic pipe and a first face of the roughly finished sealing disk such that the opening of the metallic pipe corresponds to the opening in the sealing disk; then
   (B) heating the pipe, disk and solder to the melting temperature of the solder; and
   (C) thereafter producing by grinding, lapping or polishing a sliding and sealing second face on the sealing disk opposite the first face contacting the pipe.

2. The process as claimed in claim 1, wherein prior to step (A) the first face of the roughly finished sealing disk is metallized in an area that is to contact the metallic pipe.

3. The process as claimed in claim 1, wherein the roughly finished sealing disk is soldered directly to the metallic pipe by means of an active solder.

4. The process as claimed in claim 2, wherein the metallic pipe is joined to the metallized ceramic sealing disk by soft soldering.

5. The process as claimed in claim 2, wherein the metallic pipe is joined to the metallized ceramic sealing disk by hard soldering.

6. The process as claimed in claim 1, wherein the metal of the metallic pipe is copper, iron-nickel or iron-nickel-cobalt.

7. The process as claimed in claim 1, wherein the metallic pipe has a collar-shaped flange at the end at which it is soldered.

8. The process as claimed in claim 1, wherein the metallic pipe has a collar-shaped flange at the end of which it is soldered.

9. The process as claimed in claim 1, wherein the roughly finished sealing disk is such that the sliding and sealing face is only roughly ground flat prior to step (A).

10. A process for the leakproof joining of a ceramic sealing disk having at least one opening with at least one metallic pipe having an opening, comprising the steps of:
    (A) producing by grinding, lapping or polishing a sliding and sealing first face on the roughly finished sealing disk; then
    (B) contacting together with solder the metallic pipe and a second face of the sealing disk opposite the sliding and sealing first face such that the opening of the metallic pipe corresponds to the opening in the sealing disk; then
    (C) heating the pipe, disk and solder to the melting temperature of the solder; and
    (D) thereafter cooling the pipe, disk and solder to ambient temperature at a rate of not more than 30 K/min.

11. The process as claimed in claim 10, wherein prior to step (B) a metallization is applied to an area of the second face of the disk that is to contact the metallic pipe and the disk is cooled at not more than 30 K/min.

12. The process as claimed in claim 10, wherein the sealing disk is soldered to the metallic pipe by means of an active solder.

13. The process as claimed in claim 11, wherein the metallic pipe is joined to the metallized ceramic sealing disk by soft soldering.

14. The process as claimed in claim 11, wherein the metallic pipe is joined to the metallized ceramic sealing disk by hard soldering.

15. The process as claimed in claim 10, wherein the metal of the metallic pipe is copper, iron-nickel or iron-nickel-cobalt.

16. The process as claimed in claim 10, wherein the metallic pipe has a collar-shaped flange at the end at which it is soldered.

17. The process as claimed in claim 10, wherein the roughly finished sealing disk is such that the sliding and sealing face is only roughly ground flat prior to step (A).

* * * * *